(12) United States Patent
Yada

(10) Patent No.: US 7,648,072 B2
(45) Date of Patent: Jan. 19, 2010

(54) TWO-DIMENSIONAL CODE DETECTION SYSTEM AND TWO-DIMENSIONAL CODE DETECTION PROGRAM

(75) Inventor: Shinichi Yada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/523,606

(22) Filed: Sep. 20, 2006

(65) Prior Publication Data

US 2007/0187512 A1    Aug. 16, 2007

(30) Foreign Application Priority Data

Feb. 10, 2006    (JP)    ............................ P2006-033216

(51) Int. Cl.
*G06K 9/18*    (2006.01)
(52) U.S. Cl. .................................. 235/462.09
(58) Field of Classification Search ................................
235/462.01–462.49
See application file for complete search history.

(56) References Cited

U.S. PATENT DOCUMENTS

| | | | | |
|---|---|---|---|---|
| 5,276,315 | A * | 1/1994 | Surka ....................... | 235/462.1 |
| 5,319,181 | A | 6/1994 | Shellhammer et al. | |
| 5,686,718 | A * | 11/1997 | Iwai et al. ................. | 235/462.1 |
| 5,691,527 | A * | 11/1997 | Hara et al. .................. | 235/456 |
| 5,726,435 | A * | 3/1998 | Hara et al. ............. | 235/462.09 |
| 5,951,056 | A * | 9/1999 | Fukuda et al. ................. | 283/93 |
| 6,181,839 | B1 * | 1/2001 | Kannon et al. ............... | 235/494 |
| 6,267,296 | B1 * | 7/2001 | Ooshima et al. ........ | 235/462.08 |
| 6,394,349 | B1 * | 5/2002 | Shigekusa et al. ...... | 235/462.12 |
| 6,612,497 | B1 * | 9/2003 | Iida et al. ............... | 235/462.25 |
| 6,678,412 | B1 * | 1/2004 | Shigekusa et al. ...... | 235/462.09 |
| 6,685,095 | B2 * | 2/2004 | Roustaei et al. ........ | 235/472.01 |
| 6,729,542 | B2 * | 5/2004 | Iwai et al. ............... | 235/462.08 |

(Continued)

FOREIGN PATENT DOCUMENTS

EP    0 672 994 A1    9/1995

(Continued)

OTHER PUBLICATIONS

JIS X0510: Japanese Industrial Standards, "Two Dimensional Symbol - QR Code - Basic Specification", (1999), pp. 1 -104.

*Primary Examiner*—Seung H Lee
*Assistant Examiner*—Christie I Marshall
(74) *Attorney, Agent, or Firm*—Oliff & Berridge PLC

(57) ABSTRACT

A two-dimensional-code detection system includes a reading unit, a recognizing unit, a calculating unit and a position specifying unit. The reading unit reads an image including plural two-dimensional codes. The recognizing unit recognizes position detection patterns of the respective two-dimensional codes from the read image, which includes the plural two-dimensional codes. The calculating unit that selects at least two of the position detection patterns of the two-dimensional codes. The calculating unit calculates a minimum unit forming each of the selected position detection patterns. The position specifying unit judges whether or not the minimum units forming the selected at least two position detection patterns are substantially equal to each other. When judging that the minimum units forming the selected at least two position detection patterns are substantially equal to each other, the position specifying unit specifies a position of a two-dimensional code using the selected at least two position detection patterns.

13 Claims, 12 Drawing Sheets

U.S. PATENT DOCUMENTS

| | | | |
|---|---|---|---|
| 6,863,218 B2 * | 3/2005 | Muramatsu | 235/462.25 |
| 6,918,539 B2 * | 7/2005 | Nakajima et al. | 235/454 |
| 2002/0051573 A1 * | 5/2002 | Sakai et al. | 382/194 |
| 2005/0279832 A1 * | 12/2005 | Kobayashi et al. | 235/462.07 |
| 2007/0069026 A1 * | 3/2007 | Aoyama | 235/462.09 |
| 2007/0071320 A1 | 3/2007 | Yada | |

FOREIGN PATENT DOCUMENTS

| | | |
|---|---|---|
| JP | A-06-012515 | 1/1994 |
| JP | B2-2938338 | 6/1999 |

* cited by examiner

CENTER OF POSITION DETECTION PATTERN

TWO-DIMENSIONAL CODE DETECTION SYSTEM AND TWO-DIMENSIONAL CODE DETECTION PROGRAM

BACKGROUND

Technical Field

The invention relates to a technology for reading and decoding a two-dimensional code, and particularly to a two-dimensional code detection system and a two-dimensional code detection program for reading plural two-dimensional codes simultaneously and recognizing the respective two-dimensional codes accurately.

SUMMARY

According to an aspect of the invention, a two-dimensional-code detection system includes a reading unit, a recognizing unit, a calculating unit and a position specifying unit. The reading unit reads an image including plural two-dimensional codes. The recognizing unit recognizes position detection patterns of the respective two-dimensional codes from the image, which includes the plural two-dimensional codes and is read by the reading unit. The calculating unit selects at least two of the position detection patterns of the plural two-dimensional codes read by the reading unit. The calculating unit calculates a minimum unit forming each of the selected position detection patterns. The position specifying unit judges whether or not the minimum units forming the selected at least two position detection patterns are substantially equal to each other. When judging that the minimum units forming the selected at least two position detection patterns are substantially equal to each other, the position specifying unit specifies a region of a two-dimensional code using the selected at least two position detection patterns.

BRIEF DESCRIPTION OF THE DRAWINGS

Exemplary embodiment s of invention will be described in detail based on the following figures, wherein.

DETAILED DESCRIPTION

Exemplary embodiments of the invention will be described below with reference to accompanying drawings. This exemplary embodiment relates to an algorithm for recognizing respective two-dimensional codes from a single raster image data, when a two-dimensional code detection system and a two-dimensional code detection program according to this exemplary embodiment reads a paper document on which the two-dimensional codes (e.g. QR codes) are arranged with a flatbed scanner.

(Explanation of Entire System)

Figure 1:
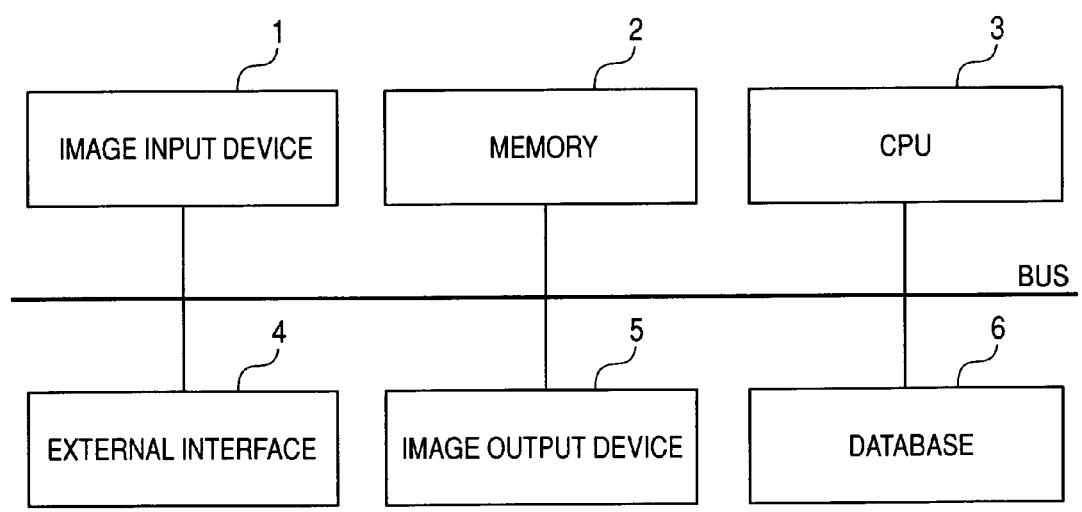
FIG. 1 is a diagram showing a configuration of a system that executes a two-dimensional code detection method according to an exemplary embodiment.

FIG. 1 is a configuration diagram showing a system that executes a two-dimensional code detection method according to an exemplary embodiment. An image input device 1 such as a scanner scans a paper document and generates raster image data. A digital camera may be used as the image input device 1. A memory 2 stores the raster image data obtained by the image input device 1. A CPU 3 reads a program and executes a detection process and a decoding process of a two-dimensional code by software. The two-dimensional code detection method according to the exemplary embodiment is implemented as a program executable by the CPU 3.

This system executes various processes on the basis of the decoded data. For instance, when the decoded data is an ID number (hereinafter, referred to as a document ID) identifying a document stored in a database, the system queries a database 6 with using the ID as a retrieving key, to acquire a document data body as a result of the query and print the document data body by using an image output device 5 such as a printer. Alternatively, the system may transmit the document data body to another computer via an external interface 4 and a network.

Hereinafter, exemplary embodiments will be described. QR codes are employed as an example of the two-dimensional code to be detected.

(Process Procedures of Entire System)

Figure 2:
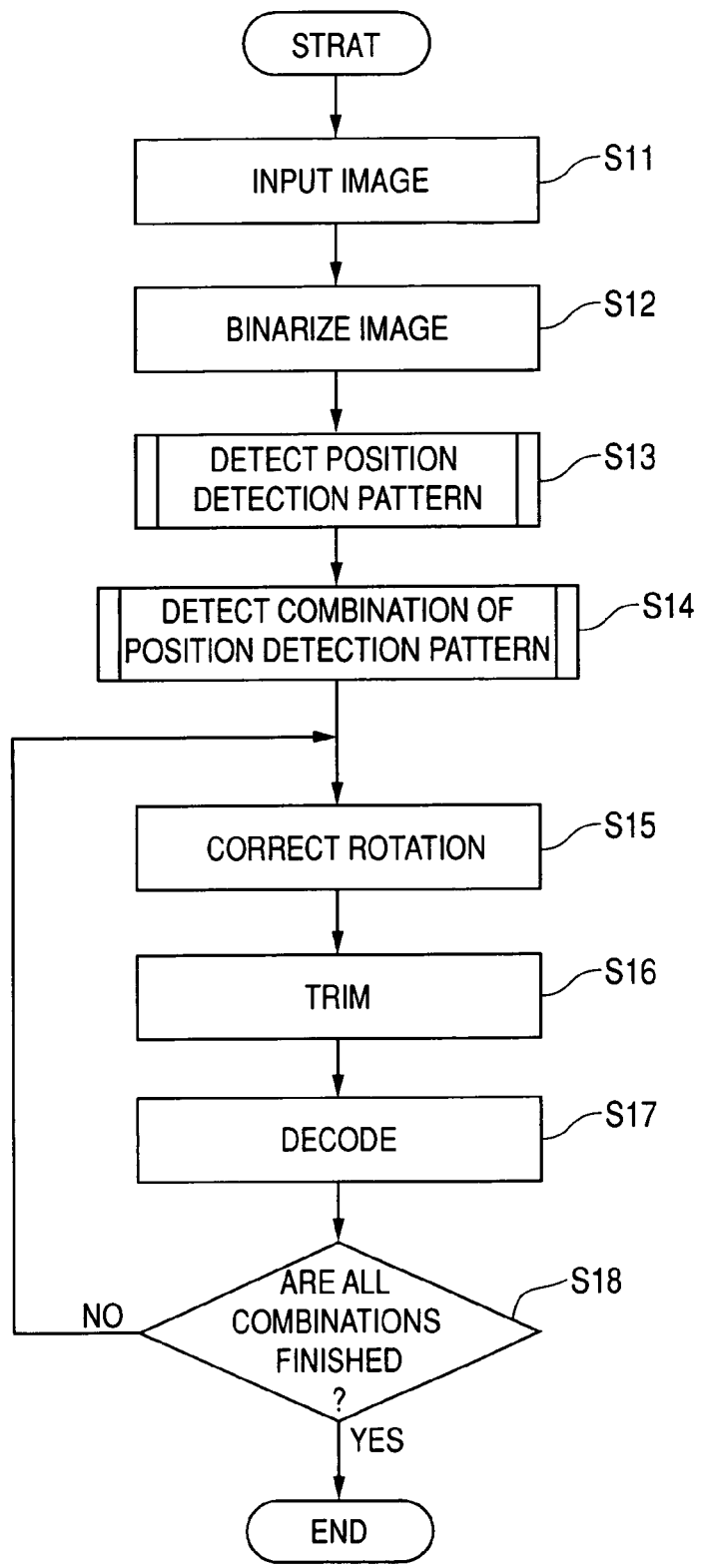
FIG. 2 is a flowchart explaining a process procedure of the entire system according to the exemplary embodiment.

FIG. 2 is a flowchart explaining a process procedure of the entire system according to the exemplary embodiment. First, the CPU 3 acquires the raster image data from the image input device 1 (step S11) and binarizes the image data (step S12). A simple binarization method, which uses a threshold value, or other binarization methods may be employed.

Next, the CPU 3 detects center coordinates of position detection patterns of the two-dimensional code (here, the QR codes) from the binarized raster image data (step S13). The QR code contains three position element patterns. As a detection method, the existing method (JIS X 0510, which is incorporated by reference in its entirety) is employed. That is, in order to detect the QR codes from the image, the CPU 3 scans the entire image and detects position element patterns. Thereafter, the CPU 3 calculates all center coordinates of the detected position element patterns.

The center coordinates of the detected position detection patterns have been calculated. At least two such position detection patterns are used (three in this exemplary embodiment) to indicate one bar code. At this step, it has not been known which combination of three position detection patterns indicates a bar code.

In a process of detecting a combination of position detection patterns (step S14), the CPU 3 determines a combination of three position detection patterns, which indicates a bar code. A method of determining the combination will be described in detail. On the basis of the thus determined combination of the three position detection patterns, the CPU 3 specifies a bar code area. Since a rotation angle of the bar code can be known from the relation among the three position detection patterns, the CPU 3 corrects the rotation angle of the bar code area for the bar code to erect the bar code area (step S15). Next, the CPU 3 trims the elected bar code area to decode the bar code (step S16). The existing decoding method (a method described in the JIS) is employed (step S17).

If plural bar codes areas are detected as a result of the combination detection, the CPU 3 performs rotation correction (step S15), trimming (step S16) and decodes process (step S17) on all the bar code areas. When all combinations are finished, the process is ended (step S18).

First Exemplary Embodiment

Figure 3:
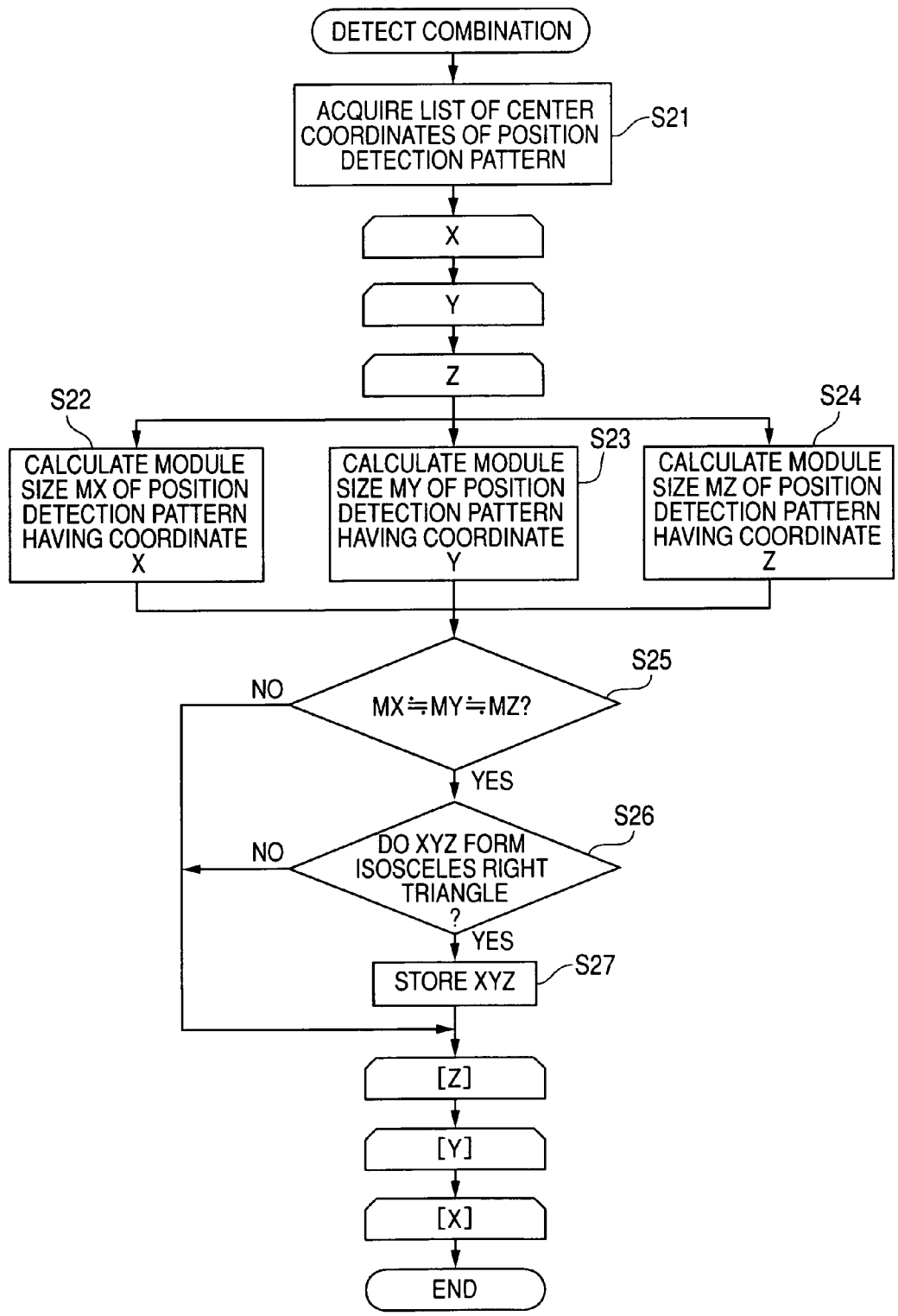
FIG. 3 is a flowchart for detecting a combination of position detection patterns, according to a first exemplary embodiment.

The detection of the combination of the position detection patterns in step 14 of FIG. 2 will be explained in detail. FIG. 3 is a flowchart for detecting the combination of the position detection patterns according to a first exemplary embodiment. This process is performed after all center coordinates of the position detection patterns are calculated by the method described in the JIS.

One QR code contains three position detection patterns. Therefore, if there are N QR codes, there are 3N center coordinates of position detection patterns. The CPU 3 acquires a list of the center coordinates (step 21).

Next, the CPU 3 selects three coordinates from among the 3N center coordinates, as a combination. A combination method selects 3 pieces from 3N pieces so as to perform a round robin system. The number of the combination is calculated by taking 3 pieces from 3N pieces. For instance, if number of the OR codes is 2, the number of the center coordinates of the position detection patterns is 2N=6, and the number of the combination selecting 3 pieces from 6 pieces is 20. If the number of the OR codes is 10, the number of the combination is 4,060 (see the following equation (1).

$$_{3N}C_3 = \frac{(3N)!}{3!(3N-3)!}$$

(Estimation of Module Size)

Next, the center coordinates of the selected three position detection patterns are referred to as X, Y, and Z, respectively. In addition, the CPU 3 calculates a module size from the position detection patterns to which the respective coordinates belong. The module size is a size of a unit square (minimum unit). The position detection patterns of the QR codes are formed of this module. Specifically, the width of an external frame of the position detection pattern is equal to seven modules.

Figure 4:
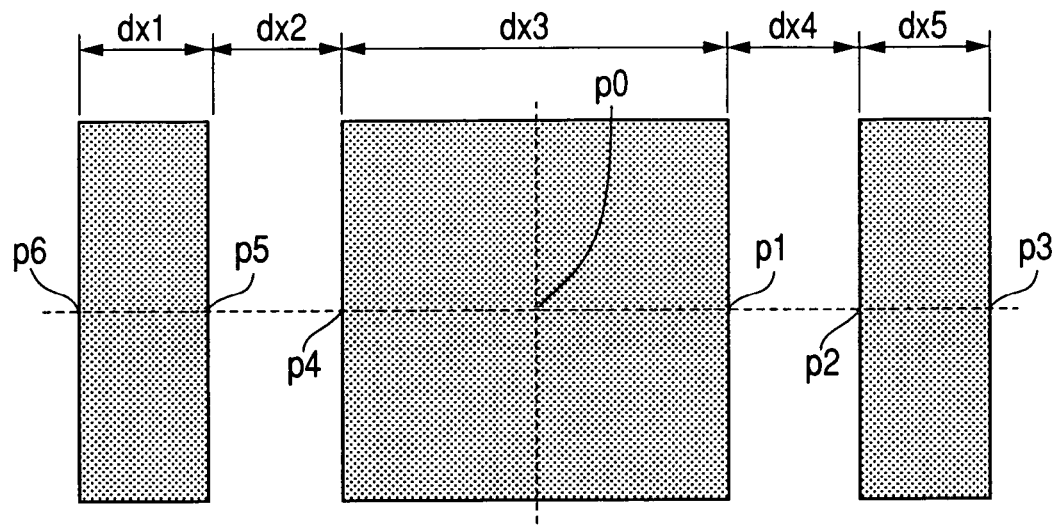
FIG. 4 is a schematic diagram explaining a method for calculating a module size from center coordinates of the position detection pattern.

FIG. 4 is a schematic diagram illustrating a method of calculating the module size from center coordinates of the position detection patterns. First, the center coordinates of the position detection patterns is referred to as p0. A center part of the position detection patterns is a black pixel. Pixel values are checked in the horizontal direction from the center point p0 (on the right side in FIG. 4), and a point where continuous black pixels turn to a white pixel is referred to as p1. Pixel values are further checked in the horizontal direction from the p1, and a point where continuous white pixels turn to a black pixel is referred to as p2. Furthermore, a point where continuous black pixels turn to a white pixel is referred to as p3. In turn, pixel values are checked in the reverse direction from the center point p0 (on the left side in FIG. 4), points p4, p5 and p6 where pixel values likewise change are calculated. A distance between points p6 and p5 is referred to as dx1, a distance between points p5 and p4 is referred to as dx2, a distance between points p4 and p1 is referred to as dx3, a distance between points p1 and p2 is referred to as dx4, and a distance between points p2 and p3 is referred to as dx5.

Figure 5:
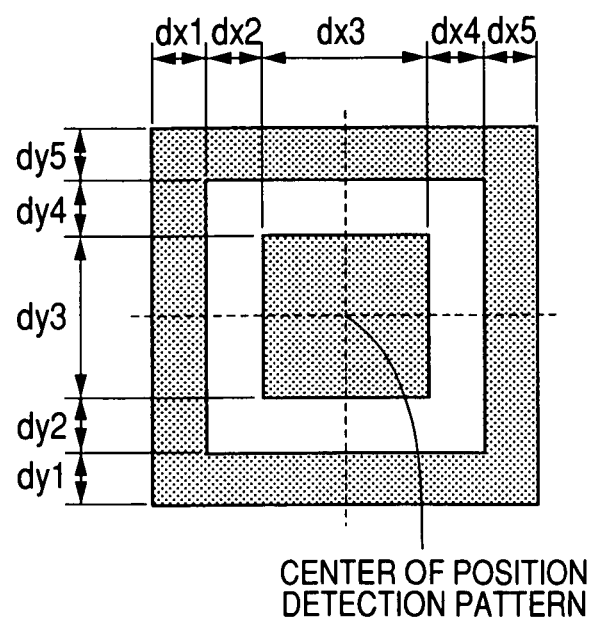
FIG. 5 is a schematic diagram explaining distance values dxi and dyi.

In the same way, pixel values are checked in the vertical direction from the center point p0, points where pixel values change are calculated, and distances dy1, dy2, dy3, dy4 and dy5 between the points are calculated as shown in FIG. 5. From these distance values, a module size may be calculated using the following equation;

$$\text{the estimated module size} = \frac{\left(dx1 + dx2 + \frac{dx3}{3} + dx4 + dx5\right) + \left(dy1 + dy2 + \frac{dy3}{3} + dy4 + dy5\right)}{10}.$$

In addition, only the horizontal distances dx1, dx2, dx3, dx4, and dx5 are calculated, and the estimated module size may be calculated on the basis of the following equation;

$$\text{the estimated module size} = \frac{\left(dx1 + dx2 + \frac{dx3}{3} + dx4 + dx5\right)}{5}.$$

By using the above method, the module sizes Mx, My, and Mz of the three position detection patterns are calculated (step S22 to S24).

Next, the CPU 3 compares the module sizes Mx, My and Mz (step S25). That is, the module sizes calculated from the three position detection patterns forming one QR code are equal to each other. If the three module sizes are different, one QR code is not formed and therefore the CPU 3 does not evaluate the combination of the three. In contrast, when the three module sizes are almost equal, there is a possibility that one QR code is formed and therefore the CPU 3 proceeds to the subsequent process. For instance, when the difference between any two of the three module sizes is within a predetermined permissible range, the CPU 3 determines two module sizes are almost equal. Furthermore, a user may designate the permissible range. Since there are variation factors due to the image scanning, some margin may be permissible when the module sizes are evaluated.

(Evaluation of Isosceles Right Triangle)

Figure 6:
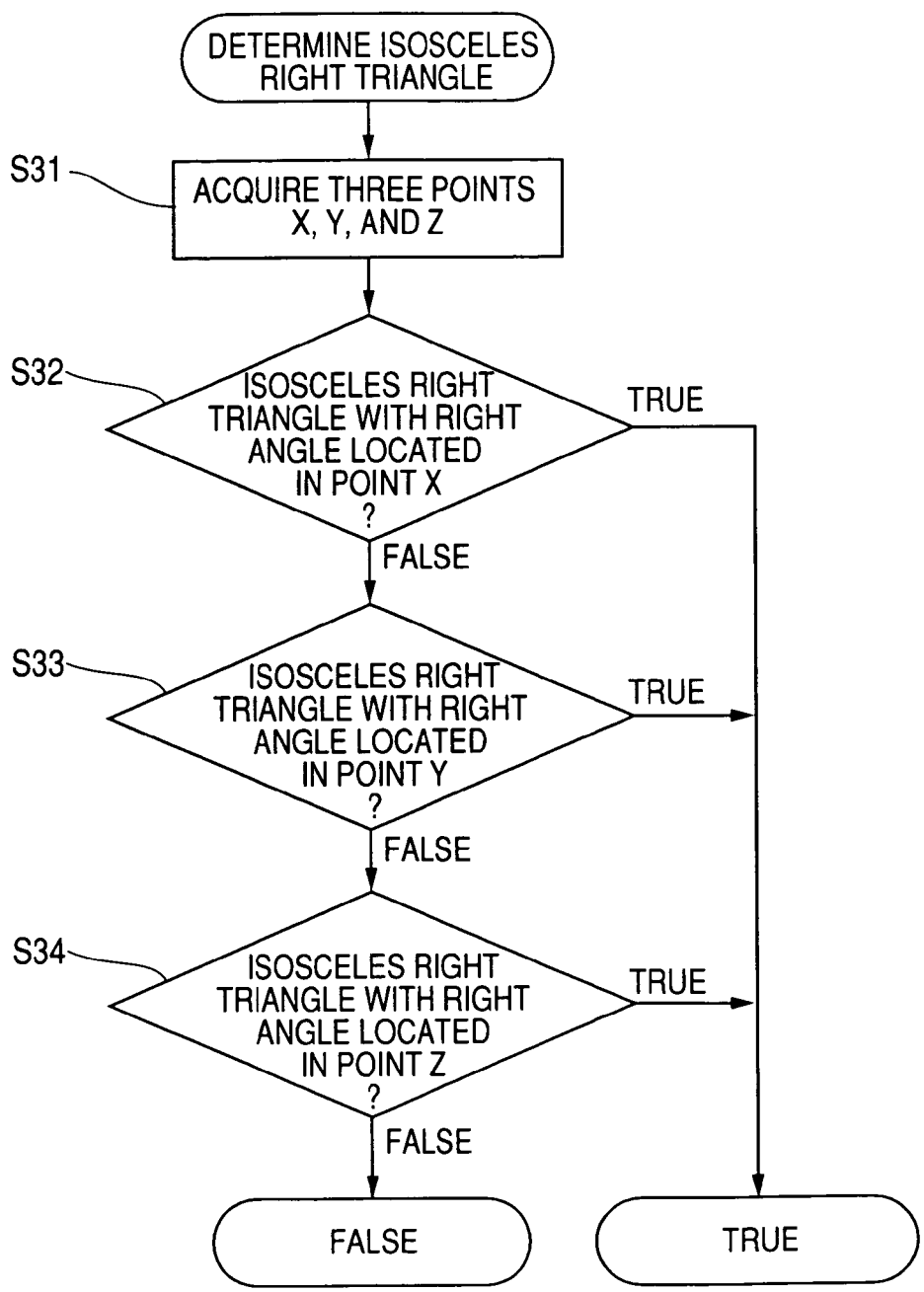
FIG. 6 is a flowchart (part 1) for judging whether or not three points form an isosceles right triangle.
Figure 7:
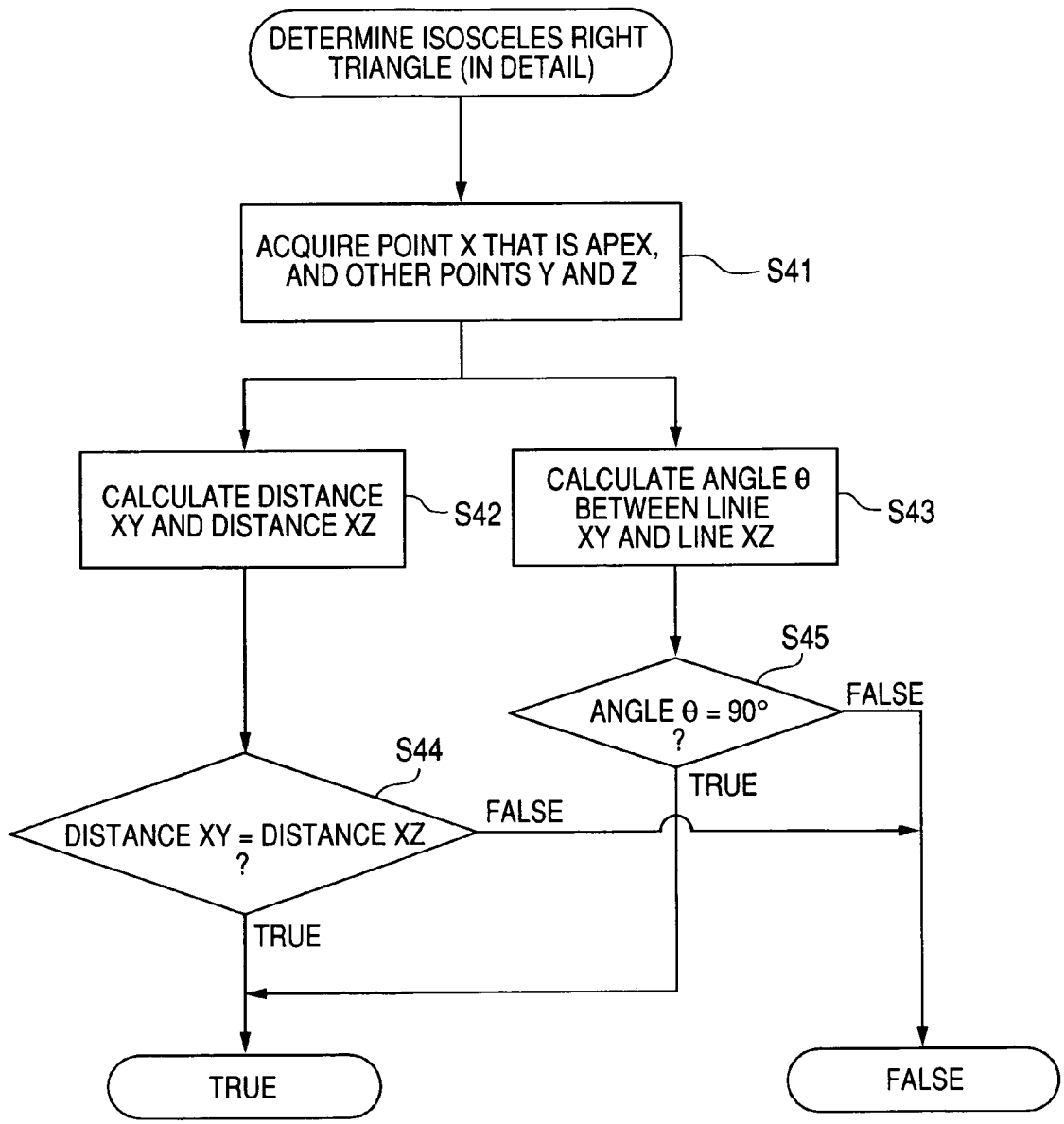
FIG. 7 is a flowchart (part 2) for judging whether or not the three points form the isosceles right triangle.

Next, the CPU 3 evaluates whether or not the center coordinates X, Y and Z of the three position detection patterns whose module sizes are almost equal form an isosceles right triangle. FIG. 6 and FIG. 7 are flowcharts for determining whether or not the three points form the isosceles right triangle.

First, in FIG. 6, the CPU 3 acquires three points, that is, the center coordinates X, Y, and Z (step S31) to thereby determine whether or not the three points form the isosceles triangle with the right angle located in the point X (step S32). When the determination is true (True), the CPU 3 determines that the three points form the isosceles right triangle. In addition, when the determination is false (False), the CPU 3 determines whether or not the three points form the isosceles right triangle with the right angle located in the point Y (step S33). When the determination is true (True), the CPU 3 determines that the three points form the isosceles right triangle. In addition, when the determination is false, the CPU 3 determines whether or not the three points form the isosceles right triangle with the right angle located in the point Z (step S33). When the determination is true (True), the CPU 3 determines that the three points form the isosceles right triangle. In addition, if the determination is false (False), the CPU 3 determines that the three points does not form the isosceles right triangle.

A process for determining whether or not the three points form the isosceles right triangle with the right angle located in each point will be described with reference to a flowchart shown in FIG. 7. That is, at first, the CPU 3 acquires the point X, which is the apex, and other points Y and Z (step S41). Then, the CPU 3 calculates a distance between X and Y and a distance between X and Z (step S42), and calculates an angle θ between a straight line XY and a straight line XZ (step S43).

Then, the CPU 3 determines whether or not the distance XY is equal to the distance XZ (step S44) and judges whether the angle θ=90° (step S45). If any of the judgments is true, the CPU 3 determines that the three points form the isosceles right triangle. If any of the judgments is false, the CPU 3 determines that the three points do not form the isosceles right triangle.

Turning to FIG. 3, when the three points form the isosceles right triangle (step S26), the CPU 3 stores the three points as the center coordinates of the three position detection patterns, which form the QR codes (step S27). The CPU 3 executes the rotation correction on the basis of the coordinates of the position detection patterns and acquires desired information by decoding the QR codes.

Second Exemplary Embodiment

A second exemplary embodiment relates to a method of calculating the module size when the position detection patterns are inclined.

(Estimation of Module from Inclined Position Detection Pattern)

Figure 8:
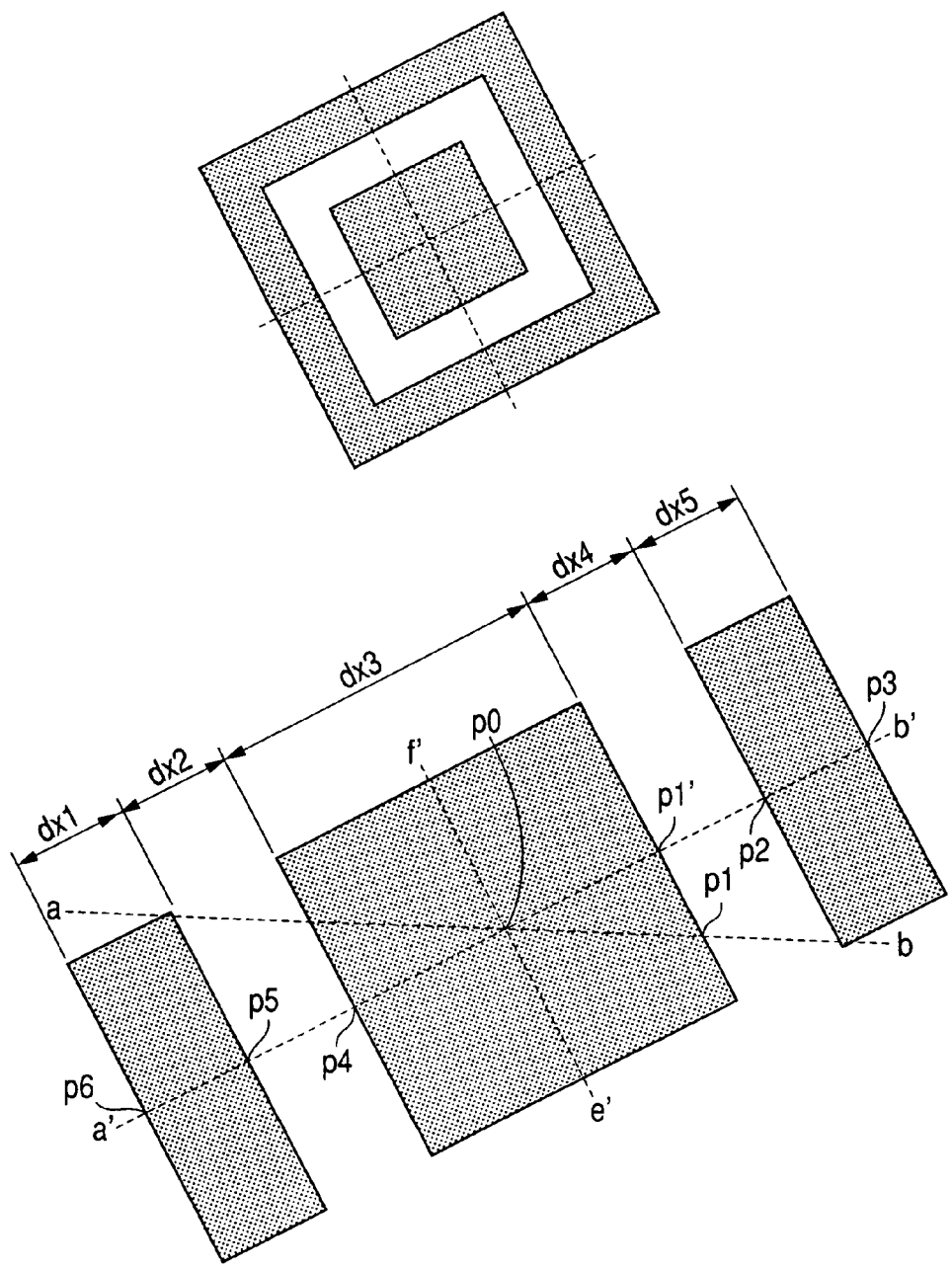
FIG. 8 is a schematic diagram showing an inclined position detection pattern.
Figure 9:
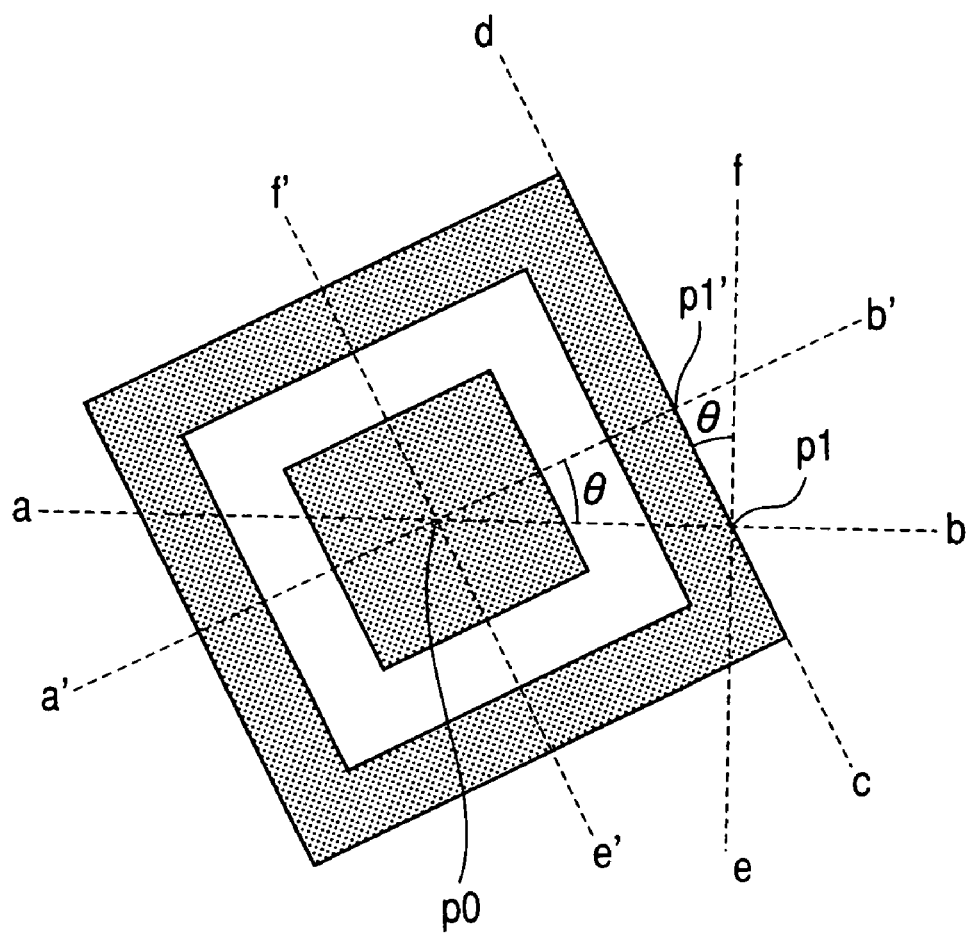
FIG. 9 is a schematic drawings (part 1) explaining calculation of the inclination.

As shown in FIGS. 8 and 9, in the case where there is a possibility that a position detection pattern is inclined, the module size is calculated as below. That is, as shown in FIGS. 8 and 9, when pixel values are checked in the horizontal direction from the center point p0 of the position detection pattern, a point where black pixels turn to a white pixel is referred to as p1. A horizontal line passing through centers of the p1 and p2 is referred to as a straight-line ab.

Figure 10:
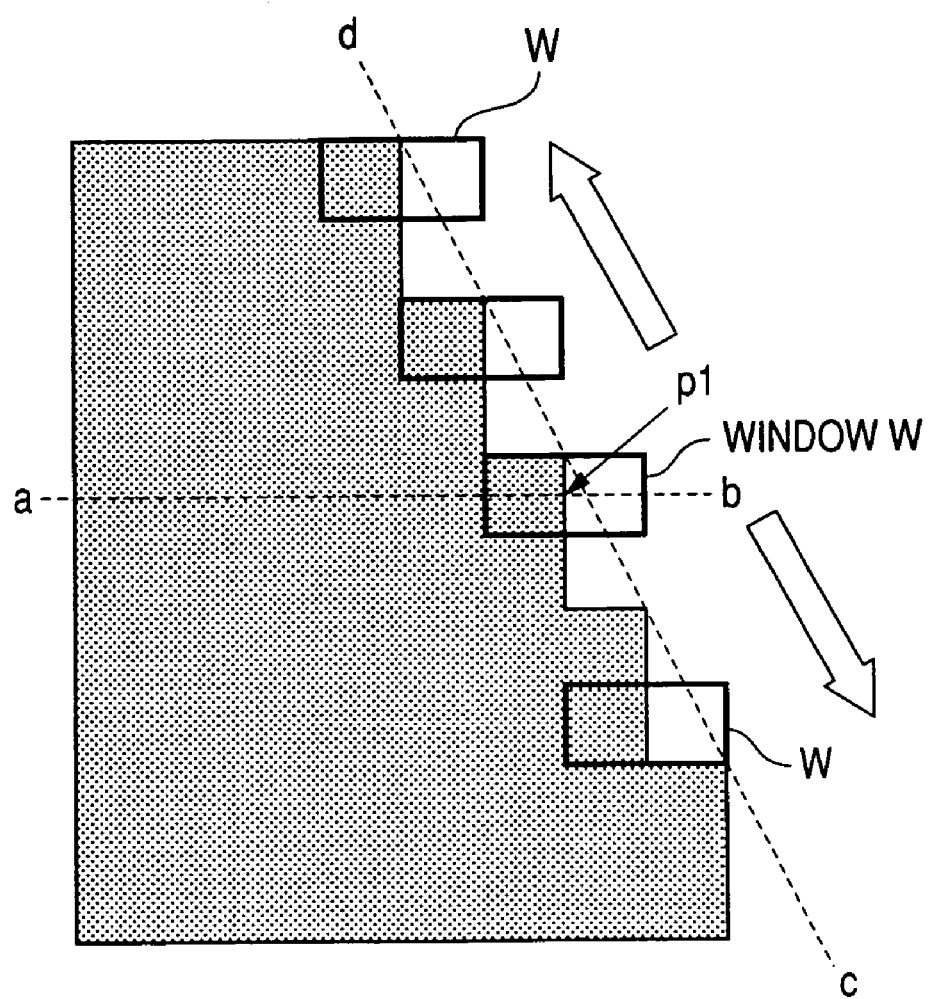
FIG. 10 is a schematic drawings (part 1) explaining the calculation of the inclination.

As shown in FIG. 10, at this time, the CPU 3 sets a window W having a size of 2 pixels in the position of p1. In addition, the CPU 3 moves the window W in the upper direction from p1 so that the left part of the window W is a black pixel and the right of the window W is a white pixel, and records a locus of the window W. Similarly, the CPU 3 moves in the downward direction from the p1 and records a locus of the window W. The locus of the window W acquired by the above method referred to as a straight-line cd. In FIGS. 8 and 9, an angle between a straight line ef, which is perpendicular to the straight-line ab and passes through the p1, and the straight-line cd (contour lines of the position detection pattern), is denoted by θ. Since the straight-line cd has been already acquired, the CPU 3 may calculate the angle θ. As shown in FIGS. 8 and 9, an inclination angle of the position detection pattern is θ.

As shown in FIG. 8, a straight line a'b', which passes through p0 and has the inclined angle θ, is set. Pixel values are checked along the straight line a'b', and black and white-turning points p1', p2, p3, p4, p5, and p6 of the pixel values are calculated. On the basis of these points, the CPU 3 may calculate the distances dx1, dx2, dx3, dx4, and dx5, respectively. Similarly, the CPU 3 calculates black and white-turning points while referring to pixel values along the straight-line e'f', and then calculates distances dy1, dy2, dy3, dy4, and dy5 between the points, respectively. In the following processes, the CPU calculates module sizes by using the similar formula as the first exemplary embodiment.

Third Exemplary Embodiment

In a third exemplary embodiment, module sizes are calculated in the same way as the first and second exemplary embodiments, and a maximum size of the QR codes, which cab be taken, is calculated from the module sizes, and a position detection pattern only within the predetermined range is estimated.

(Specification of Maximum QR Size from Module Size)

Figure 11:
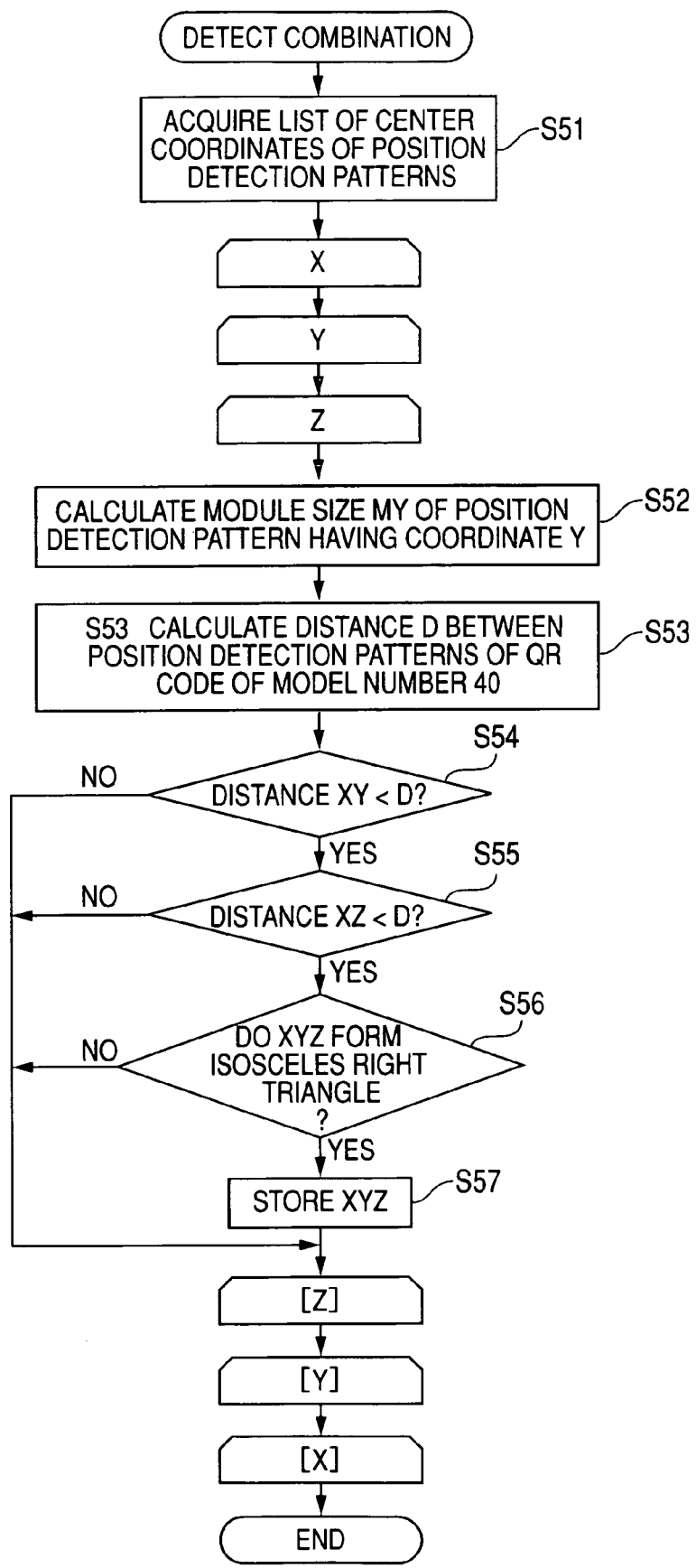
FIG. 11 is a flowchart explaining a third exemplary embodiment.

FIG. 11 is a flowchart explaining a third exemplary embodiment. That is, in the same way as the first exemplary embodiment, the CPU 3 acquires a list of the center coordinates of the position detection pattern (step S51), and the center coordinates of the selected three position detection patterns are referred to as X, Y and Z, respectively. In addition, a module size Mx of the position detection pattern having the center point X is calculated (step S52).

Figure 12:
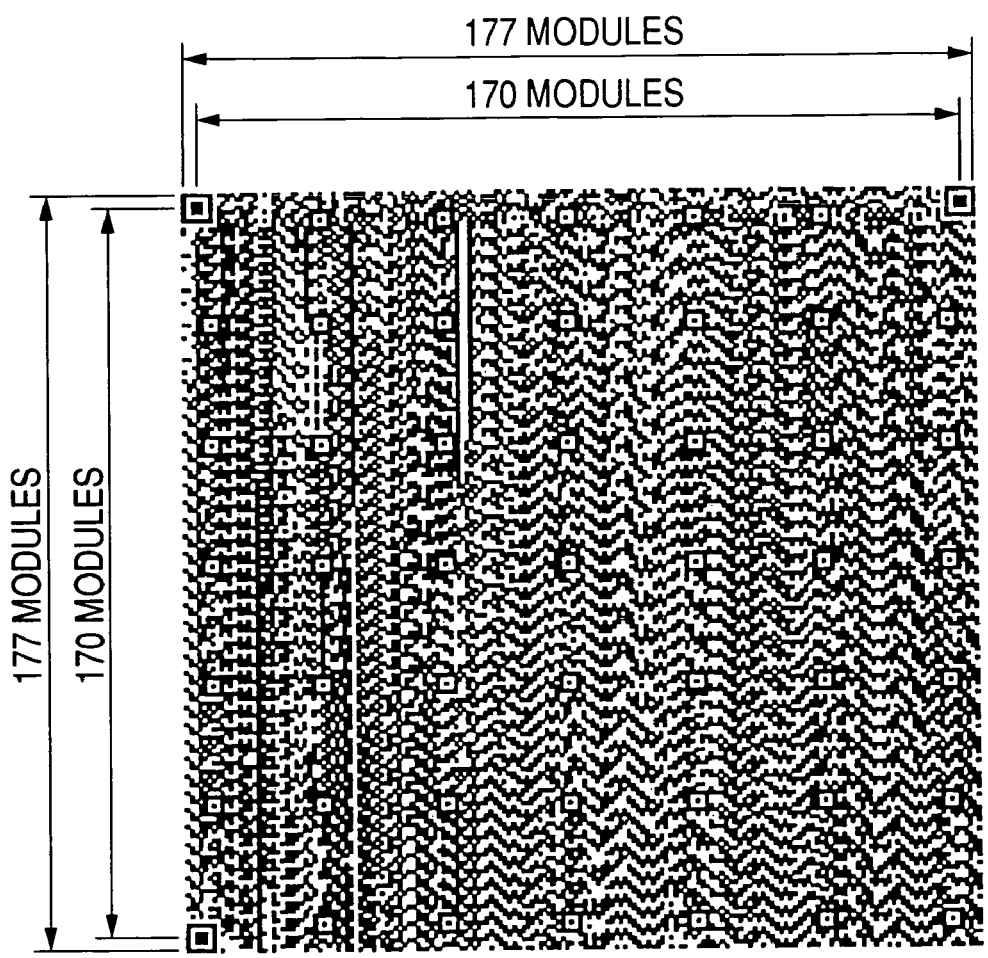
FIG. 12 is a schematic diagram showing an example of a QR code having model number 40.

The QR codes are defined from the model number 1 to the model number 40 in JIS. The largest number is the model number 40. FIG. 12 is an example of the QR code of the model number 40. The QR code of the model number 40 is formed of 177 modules. At this time, position detection patterns are provided on an edge of the QR code and the position detection pattern is formed of seven modules. Therefore, a distance between the centers of the position detection pattern is 170 modules.

Figure 13:
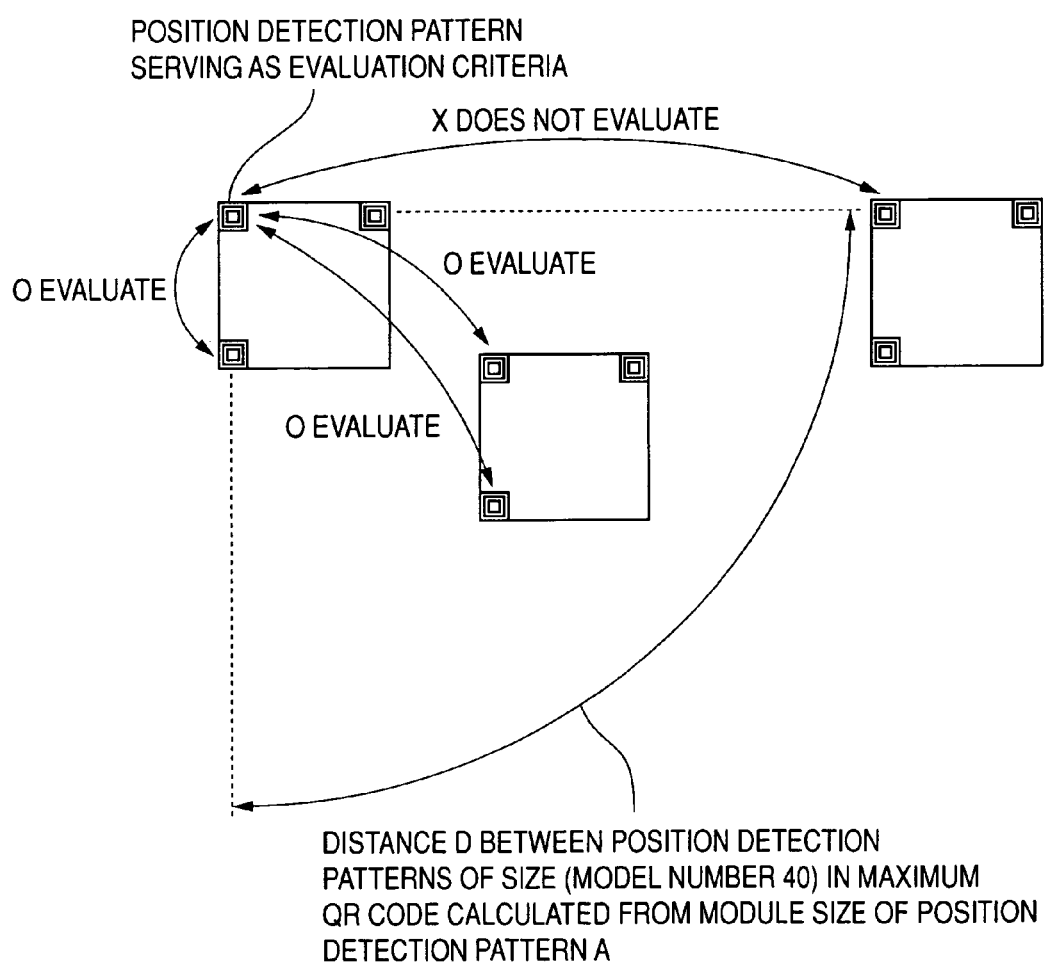
FIG. 13 is a schematic diagram explaining to judge based on distances, whether or not there is possibility that position detection patterns constitute the same QR code.

The module size Mx of the position detection pattern having the center point X has been already calculated. It is assumed that a distance between the position detection patterns of this QR code whose module size is D. In this case, D is equal to 170·Mx. Accordingly, a center point of the position detection pattern where a distance from the center point X is within D may form one QR code together with the center point X. In contrast, a center point of the position detection pattern where a distance from the center point X is longer than D cannot form one QR code together with the center point X. (see FIG. 13)

The CPU 3 compares the distance D with the distances XY and XZ between the center points of the selected three position detection patterns (step S54 to S55). When the distances XY and XZ are shorter than the distance D (Yes in step S54 and S55), there is a possibility that the points X, Y and Z form one QR code. Therefore, the CPU 3 estimates whether or not the three points form the isosceles right triangle (step S56). The subsequent process is similar to the first exemplary embodiment. When the three points form the isosceles right triangle, the CPU 3 stores the three points X, Y and Z (step S57).

In the explained exemplary embodiment, the QR code is selected as the example of the two-dimensional code. The two-dimensional code detection method and the two-dimensional code detection program are applied to an image forming apparatuses such as a copier as well as a small apparatus such as a mobile phone and a mobile terminal. In addition, the two-dimensional code detection program may be stored in a predetermined storage medium to be distributed, or may be distributed through a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A two-dimensional-code detection system comprising:
a reading unit that reads an image including a plurality of two-dimensional codes;
a recognizing unit that recognizes position detection patterns of the respective two-dimensional codes from the image, which inclueds the plurality of two-dimensional codes and is read by the reading unit;
a calculating unit that arbitrarily selects at least three of the position detection patterns of the plurality of two-dimensional codes read by the reading unit before the calculating unit calculates a minimum unit forming each of the selected position detection patterns; and
a position specifying unit that judges whether or not the minimum units forming the selected at least three position detection patterns are substantially equal to each other, wherein:
when judging that the minimum units forming the selected at least three position detection patterns are substantially equal to each other, the position specifying unit determines whether or not a combination of the selected at least three position detection patterns form an isosceles right triangle and specifies a region of a two-dimensional code on the basis of the combination of the selected at least three position detection patterns that formed the isosceles right triangle.

2. The system according to claim 1, wherein the two-dimensional codes are QR codes.

3. The system according to claim 1, wherein:
the calculating unit scans each of the selected position detection patterns in at least one direction to detect number of continuous ON pixels and number of continuous OFF pixels, and
the calculating unit calculates the minimum unit forming each of the selected position detection patterns based on the detected number of the continuous ON pixels and the detected number of the continuous OFF pixels.

4. The system according to claim 1, wherein:
the calculating unit scans each of the selected position detection patterns along a virtual straight line passing through a center of the selected position detection patterns to obtain pixel-change positions at which pixel values change between ON and OFF,
the calculating unit calculates distances between respective adjacent pixel-change positions, and
the calculating unit calculates the minimum unit forming each of the selected position detection patterns based on the detected number based on the calculated distances.

5. The system according to claim 1, wherein:
the calculating unit scans the image including the two-dimensional codes, in one direction plural times to calculate a rotational shift of the two-dimensional codes based on arrangement of at least one of ON pixels and OFF pixels, which are detected in each scanning, and
the calculating unit corrects the rotational shift of the two-dimensional codes and then, calculates the minimum unit forming each of the selected position detection patterns.

6. The system according to claim 1, wherein:
the calculating unit calculates an inclination angle of at least one of the selected position detection patterns with respect to a horizontal direction of the read image, and
the calculating unit corrects a rotational shift of the selected position detection patterns based on the calculated inclination angle.

7. The system according to claim 6, wherein:
the calculating unit calculates an angle between one of outermost contour lines of the at least one of the selected position detection patterns and a first virtual line, which is perpendicular to a second virtual line passing through a center of the at least one of the selected position detection patterns, as the inclination angle.

8. The system according to claim 7, wherein:
the calculating unit scans the at least one of the selected position detection patterns in one direction with a window having a size of plural pixels to detect the one of the outermost contour lines.

9. The system according to claim 1, wherein:
the calculating unit calculates a distance between the selected position detection patterns,
the position specifying unit judges whether or not the calculated distance exceeds a predetermined value, and
when judging that the calculated distance does not exceed the predetermined value, the position specifying unit specifies the position of the two-dimensional code using the selected at least three position detection patterns.

10. The system according to claim 1, wherein:
the calculating unit calculates a distance between the selected position detection patterns,
the position specifying unit judges whether or not the calculated distance exceed a maximum value that a two-dimensional code can take as a distance between position detection patterns, and
when judging that the calculated distance does not exceed the maximum value, the position specifying unit specifies the position of the two-dimensional code using the selected at least three position detection patterns.

11. A computer readable medium storing a program causing a computer to execute a process for detecting a two-dimensional code, the process comprising:
reading an image including a plurality of two-dimensional codes;
recognizing position detection patterns of the respective two-dimensional codes from the read image, which includes the plurality of two-dimensional codes;
selecting, arbitrarily, at least three of the position detection patterns of the plurality of two-dimensional codes before calculating a minimum unit forming each of the selected position detection patterns;
judging whether or not the minimum units forming the selected at least three position detection patterns are substantially equal to each other, and
when it is judged that the minimum units forming the selected at least three position detection patterns are substantially equal to each other, determining whether or not a combination of the selected at least three position detection patterns form an isosceles right triangle and specifying a position of a two-dimensional code on the basis of the combination of the selected at least three position detection patterns that formed the isosceles right triangle.

12. The computer readable medium according to claim 11, further comprising:
   calculating a distance between the selected position detection patterns; and
   judging whether or not the calculated distance exceeds a predetermined value, wherein:
   when it is judged that the calculated distance does not exceed the predetermined value, specifying the position of the two-dimensional code using the selected at least three position detection patterns.

13. The computer readable medium according to claim 11, further comprising:
   calculating a distance between the selected position detection patterns; and
   judging whether or not the calculated distance exceed a maximum value that a two-dimensional code can take as a distance between position detection patterns, wherein:
   when it is judged that the calculated distance does not exceed the maximum value, specifying the position of the two-dimensional code using the selected at least three position detection patterns.

* * * * *